US006471940B1

United States Patent
Kurata et al.

(10) Patent No.: US 6,471,940 B1
(45) Date of Patent: Oct. 29, 2002

(54) PREPARATION OF ZEOLITE

(75) Inventors: Yohei Kurata, Kawasaki (JP); Hideaki Hamada, Tsukuba (JP); Takaaki Hanaoka, Tsukuba (JP); Yoshihiro Sugi, Gifu (JP); Yoshihiro Kubota, Gifu (JP)

(73) Assignees: Japan Chemical Innovation Institute, Tokyo (JP); Secretary of Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/669,891

(22) Filed: Sep. 27, 2000

(30) Foreign Application Priority Data

Sep. 28, 1999 (JP) .......................................... 11-274295

(51) Int. Cl.[7] .............................................. C01B 39/48
(52) U.S. Cl. ........................................ 423/707; 423/708
(58) Field of Search ............................... 423/700, 707, 423/708, 718

(56) References Cited

U.S. PATENT DOCUMENTS

| 3,594,121 | A | * | 7/1971 | Weber | |
|---|---|---|---|---|---|
| 4,695,667 | A | | 9/1987 | Sumitani et al. | |
| 5,106,801 | A | | 4/1992 | Zones et al. | 502/64 |
| 5,340,563 | A | | 8/1994 | Zones et al. | |
| 5,558,851 | A | * | 9/1996 | Millller | 423/702 |
| 6,004,527 | A | * | 12/1999 | Murrell et al. | 423/712 |
| 6,022,519 | A | * | 2/2000 | Shimizu et al. | 423/700 |

FOREIGN PATENT DOCUMENTS

| EP | 0 042 226 A1 | 12/1981 |
|---|---|---|
| EP | 0 142 317 A2 | 5/1985 |
| EP | 0 463 768 A2 | 1/1992 |
| JP | 11-60236 | 3/1999 |
| JP | 11060236 | * 3/1999 |
| WO | WO 90/04567 | 5/1990 |

OTHER PUBLICATIONS

M. Sasidharan, et al., Surface acidity of Al–, Ga–and Fe–silicate analogues of zeolite NCL–1 characterized by FTIR, TPD ($NH_3$) and catalytic methods, Microporous and Mesoporous Materials, 24, 1998, pp. 59–67.

K. Ramesh Reddy et al., *Synthesis and Characterization of a Large Pore Vanadium–containing Molecular Sieve, V–NCL–1*, J. Chem. Soc., Chem., Commun., 1992, pp. 1613–1615.

K. Ramesh Reddy, et al., Studies on the crystallization of a novel, large–pore, high–silica molecular sieve, NCL–1, Zeolites, Jun. 1994, vol. 14, pp. 326–334.

Raul F. Lobo, et al., A Model for the Structure of the Large–Pore Zeolite SSZ–31, J. Am. Chem. Soc. 1997, 119, pp. 3732–3744.

Rajib Bandyopadhyay, et al. Synthesis of [Al]–SSZ–31 by Dry –Gel Conversion (DGC) Method, *Chemistry Letters 2000* (Apr. 5, 2000) pp. 300–301.

(List continued on next page.)

*Primary Examiner*—David Sample
(74) *Attorney, Agent, or Firm*—Sughrue Mion, PLLC

(57) ABSTRACT

A process is provided for preparing zeolite, particularly [Al]-SSZ-31, which comprises the steps of providing a mixture of a zeolite source, an aluminum-containing material, an organic structure directing substance, preferably at least one selected from the group consisting of N,N'-bis-triethyl-1,6-hexanediyl-diammonium dihydroxide, N,N'-bis-triethyl-1,7-heptanediyl-diammonium dihydroxide, N,N'-bis-triethyl-1,8-octanediyl-diammonium dihydroxide, N,N'-bis-triethyl-1,9-nonanediyl-diammonium dihydroxide, N,N'-bis-triethyl-1,10-decanediyl-diammonium dihydroxide, and their salts, and water; drying said mixture to form a powdered dry gel; and contacting and reacting said dry gel with steam at a saturated vapor pressure to produce an aluminum-containing zeolite [Al]-SSZ-31.

24 Claims, 1 Drawing Sheet

OTHER PUBLICATIONS

P.R. Hari Prasad Rao, et al., Phase Transformation of High Silica BEA to OU–1 and MTW, *Chemistry Letters 1998* pp. 311–312 (No month).

Masahiko Matsukata et al, Conversion of dry gel to microporous crystals in gas phase, 1999, *Topics in Catalysis* 9 pp. 77–92.

Takashi Tatsumi, et al., Synthesis of Ti–beta Zeolite with High Oxidation Activity by Dry–gel Conversion Technique, *Chemistry Letters 1997* pp. 677–678.

P.R. Hari Prasad Rao et al., Synthesis of BEA by dry gel conversion and its characterization, *Microporous and Mesoporous Materials* 21(1998) pp. 305–313.

P.R. Hari Prasad Rao et al., Dry–gel conversion technique for synthesis of zeolite BEA, *Chem. Commun.,* 1996, pp. 1441–1442.

* cited by examiner

PREPARATION OF ZEOLITE

BACKGROUND OF THE INVENTION

1. Field of the Invention

The present invention relates to a process for preparing zeolite, particularly zeolite [Al]-SSZ-31.

2. Description of the Related Art

Zeolites are porous materials having regular and uniform micropores of about 0.36–0.74 nm as well as a large specific surface area. Accordingly, zeolite, when used to provide reaction sites, may provide a molecular shape-selective reaction. Particularly, an aluminum-containing zeolite of called [Al]-SSZ-31 has large pores and is a high silica zeolite so that it is expected to be useful for a molecular shape-selective reaction of a large aromatic compound such as alkylation reaction. Zeolites with a large pore size are also expected to be useful as molecular sieve films.

Although zeolite [Al]-SSZ-31 is made substantially from a silica material, it is usually prepared by first preparing boron-containing [B]-SSZ-31 followed by substituting aluminum for boron. To prepare [B]-SSZ-31, boron beta is first prepared and calcined, then an organic structure directing substance and a silica source are added thereto, and thereafter a hydrothermal reaction is effected to crystallize and obtain [B]-SSZ-31, as disclosed in U.S. Pat. No. 5,106,801.

However, this process requires a large amount of boron beta and a calcination step, which are not desired.

No direct process of preparation of [Al]-SSZ-31, containing aluminum and having effective acid points, is known.

An object of the present invention is to provide a process for preparing zeolite, particularly SSZ-31, more specifically [Al]-SSZ-31.

An other object is to provide a convenient process for preparing said zeolite.

A further object is to provide said zeolite having a high purity.

SUMMARY OF THE INVENTION

To attain the above and other objects, the present invention provides a process for preparing zeolite [Al]-SSZ-31, comprising the steps of: providing a mixture of a zeolite source, an aluminum-containing material, an organic structure directing substance, and water; drying said mixture to form a powdered dry gel; and contacting and reacting said dry gel with water steam at a saturated vapor pressure to produce an aluminum-containing zeolite [Al]-SSZ-31.

Preferably the organic structure directing substance is selected from the group consisting of N,N'-bis-triethyl-1,6-hexanediyl-diammonium dihydroxide, N,N'-bis-triethyl-1,7-heptanediyl-diammonium dihydroxide, N,N'-bis-triethyl-1,8-octanediyl-diammonium dihydroxide, N,N'-bis-triethyl-1,9-nonanediyl-diammonium dihydroxide, N,N'-bis-triethyl-1,10-decanediyl-diammonium dihydroxide, and their salts.

The present invention also provides a process for preparing zeolite, comprising the steps of: providing a mixture of a zeolite source, an organic structure directing substance selected from the group consisting of N,N'-bis-triethyl-1,6-hexanediyl-diammonium dihydroxide, N,N'-bis-triethyl-1,7-heptanediyl-diammonium dihydroxide, N,N'-bis-triethyl-1,8-octanediyl-diammonium dihydroxide, N,N'-bis-triethyl-1,9-nonanediyl-diammonium dihydroxide, N,N'-bis-triethyl-1,10-decanediyl-diammonium dihydroxide and their salts, and water; drying said mixture to form a powdered dry gel; and contacting and reacting said dry gel with water steam at a saturated vapor pressure to produce a zeolite.

DETAILED DESCRIPTIONS OF THE INVENTION

Figure 1:
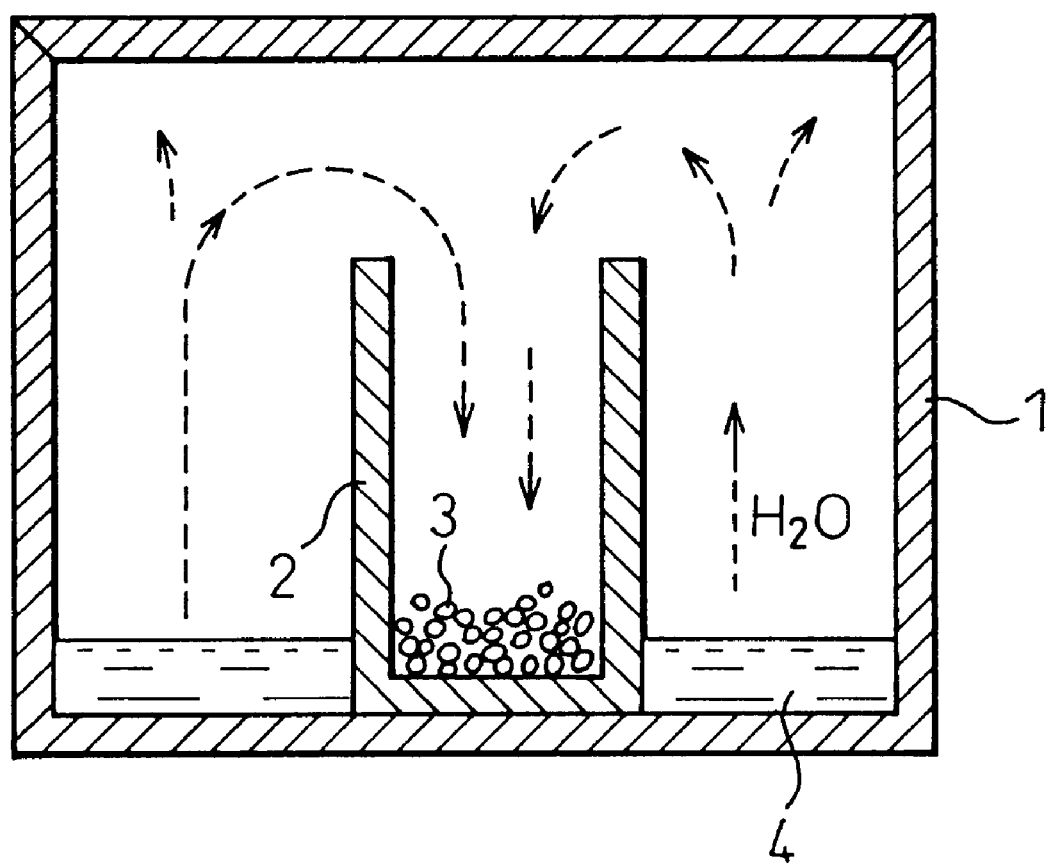
FIG. 1 shows an apparatus used for preparation of zeolite in an Example of the present invention.

Zeolite [Al]-SSZ-31 has a crystal structure that exhibits the following X-ray diffraction pattern characteristic peaks:

TABLE 1

| $2\theta$ | d/n | $I/I_0$ |
| --- | --- | --- |
| 6.10 | 14.49 | 6 |
| 7.38 | 11.98 | 30 |
| 8.18 | 10.81 | 11 |
| 20.30 | 4.37 | 15 |
| 21.12 | 4.21 | 69 |
| 22.25 | 3.99 | 100 |
| 24.73 | 3.60 | 23 |
| 30.90 | 2.89 | 11 |

In the above table, $\theta$ is a Bragg angle, I is a peak value, $I_0$ is the maximum peak value, d is a lattice spacing (Å) and n is an integer. When a metal or other cation in the zeolite is substituted, the lattice spacings and the relative peak values may be slightly varied, but the characteristic feature of the above table is maintained. Also, a similar slight variation may occur depending on variation of the preparation process such as the kind of an organic compound or a molar ratio between metal and silicon.

The zeolite [Al]-SSZ-31 is an SSZ-31 in which the metal includes at least aluminum.

The usefulness of zeolite [Al]-SSZ-31 is also described in U.S. Pat. No. 5,106,801.

The zeolite source for preparation of zeolite-[Al]-SSZ-31 of the present invention is basically a silica source, for example, fine particulate silica, colloidal silica, and tetraethoxysilane (TEOS).

The zeolite source usually contains, in addition to the silica source, sources of metal oxides such as aluminum oxide, gallium oxide and iron oxide. In the preparation of zeolite-[Al]-SSZ-31, since an aluminum-containing material, as the metal oxide sources, is essentially contained, the zeolite source may be a silica source alone but may further contain other metal-containing materials such as gallium oxide and iron oxide.

The aluminum-containing material used in the present invention as the essential ingredient or as an optional ingredient may be, for example, metal aluminum, aluminum sulfate, aluminum nitrate, sodium aluminate, etc.

An alkali such as sodium hydroxide, lithium hydroxide, potassium hydroxide or cesium hydroxide may also be added.

Examples of the organic structure directing substances used for preparation of zeolite-[Al]-SSZ-31 in the present invention are described in U.S. Pat. No. 5,106,801 and include N,N,N-trimethylammonium-8-tricyclo[5.2.1.0] decane, trimethylammonium-2,2,6,6-tetramethylpiperidine and others.

The preferred organic structure directing substance to be used in the present invention includes N,N'-bis-triethyl-1,6- hexanediyl-diammonium dihydroxide, N,N'-bis-triethyl-1,
7-heptanediyl-diammonium dihydroxide, N,N'-bis-triethyl-
1,8-octanediyl-diammonium dihydroxide, N,N'-bis-triethyl-
1,9-nonanediyl-diammonium dihydroxide, N,N'-bis-
triethyl-1,10-decanediyl-diammonium dihydroxide and
their salts. N,N'-bis-triethyl-1,6-hexanediyl-diammonium
dihydroxide, N,N'-bis-triethyl-1,7-heptanediyl-
diammonium dihydroxide, N,N'-bis-triethyl-1,8-octanediyl-
diammonium dihydroxide and their salts are more preferable.

These compounds are represented by the following formula:

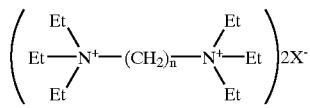

where Et stands for ethyl; X⁻ stands for an anion such as OH⁻ and a halogen ion (Br⁻, etc.); and n is an integer of 6 to 10.

The preparation of these compounds may be done by the process as described in the Examples. For example, N,N'-bis-triethyl-1,6-hexanediyl-diammonium dihydroxide or its salt may be prepared, for example, by the process in which 1,6-dibromohexane is reacted with triethylamine to form N,N'-bis-triethyl-1,6-hexanediyl-diammonium dibromide, which is ion exchanged to form N,N'-bis-triethyl-1,6-hexanediyl-diammonium dihydroxide. Other compounds may be prepared in the similar process in which 1,6-dibromohexane is replaced with 1,7-dibromoheptane, 1,8-dibromooctane, 1,9-dibromononane or 1,10-dibromodecane. A salt of N,N'-bis-triethyl-1,6-hexanediyl-diammonium dihydroxide or other dihydroxide compound as mentioned above may also be used since it may work by being transformed into N,N'-bis-triethyl-1,6-hexanediyl-diammonium dihydroxide or other dihydroxide compound as mentioned above during the zeolite synthesis process.

It was found that, in the preparation process of the present invention using the above compounds as the organic structure directing substance, zeolite-[Al]-SSZ-31 is produced with high purity.

The above compounds may be also used as an organic structure directing substance for zeolite other than zeolite-[Al]-SSZ-31. In the process for preparation of zeolite of the present invention using various zeolite sources in combination with at least one of N,N'-bis-triethyl-1,6-hexanediyl-diammonium dihydroxide, N,N'-bis-triethyl-1,7-heptanediyl-diammonium dihydroxide, N,N'-bis-triethyl-1,8-octanediyl-diammonium dihydroxide, N,N'-bis-triethyl-1,9-nonanediyl-diammonium dihydroxide, N,N'-bis-triethyl-1,10-decanediyl-diammonium dihydroxide and their salts as an organic structure directing substance, zeolites other than zeolite-[Al]-SSZ-31 can be synthesized.

The water used in the present invention is preferably a high purity water, particularly ion-exchanged water.

The amounts of the starting materials for preparation of zeolite-[Al]-SSZ-31 are, based on 100 moles of the silica source (as silica), 0.01–5 moles, more preferably 0.1–2 moles of the aluminum source (as aluminium), 1–30 moles, more preferably 5–20 moles of the alkali, 10–50 moles, more preferably 15–30 moles of the organic structure directing substance, and 500–10000 moles, more preferably 2000–7000 moles of the water.

The amounts of the starting materials for preparation of zeolites other than zeolite-[Al]-SSZ-31 can be substantially similar to the above considering the aluminum source (as aluminium) as the metal source, or may be varied to some extent.

The starting materials for preparation of zeolite are mixed and stirred to form a uniform reaction starting material composition, which is then dried to form a dry gel. The drying is effected by heating at 40–100° C., more preferably 60–95° C. until the entire material becomes a powdery dry gel. The time for heating is generally 0.5–10 hours, more preferably 1–5 hours.

The thus obtained powdered dry gel is contacted with steam at the saturated vapor pressure to react and to prepare an aluminum-containing zeolite-[Al]-SSZ-31 or other zeolite. A desired zeolite is obtained by heating generally 100–200° C., more preferably 160–190° C. for generally 3 hours to 10 days, more preferably 20 hours to 3 days. The reaction of the powdery dry gel with steam at the saturated vapor pressure is performed, for example, referring to FIG. 1, by placing a container 2 containing therein a dry gel 3 in a closed reactor 1, providing water 4 in the reactor 1, and heating to effect the reaction in the water vapor atmosphere with saturated vapor pressure.

In accordance with the above preparation process of zeolite of the present invention, an aluminum-containing zeolite-[Al]-SSZ-31, which was difficult to obtain in the conventional hydrothermal synthesis process, can be synthesized at a high rate and with a high yield and purity. The dry gel conversion process used in the present invention has the following advantages in comparison with the conventional hydrothermal synthesis process:

i) The volume of a heating container can be small since the volume of the dry gel is significantly smaller than the corresponding hydrogel.
ii) The time required for crystallization is short. Conventionally 10 days or more is required but only 2–3 days are required in the present invention.
iii) The yield of the crystallized product is high. The yield of the crystallized product in the conventional process is 60–70% but that in the present invention is 90%.

In accordance with the present invention, there is also provided a process for preparing zeolite using at least one selected from the group consisting of N,N'-bis-triethyl-1,6-hexanediyl-diammonium dihydroxide, N,N'-bis-triethyl-1,7-heptanediyl-diammonium dihydroxide, N,N'-bis-triethyl-1,8-octanediyl-diammonium dihydroxide, N,N'-bis-triethyl-1,9-nonanediyl-diammonium dihydroxide, N,N'-bis-triethyl-1,10-decanediyl-diammonium dihydroxide and their salts as an organic structure directing substance.

EXAMPLES

Example 1

Synthesis of N,N'-bis-triethyl-1,6-hexanediyl-diammonium dibromide.

In a flask equipped with potassium hydroxide tube, 15.68 g (61.70 mmol) of 1,6-dibromohexane and 80 ml of acetone were charged and stirred. A solution of 23.47 g (231.8 mmol) of triethylamine and 30 ml of acetone were dropwisely added thereto at room temperature in about 10 minutes. After the completion of the addition, the stirring was continued under reflux for 70 hours. The solution was then allowed to cool filtered was and washed with 50 ml of acetone to obtain 25.8 g (94%) of coarse crystal of N,N'-bis-triethyl-1,6-hexanediyl-diammonium dibromide. The coarse crystal was dissolved while heating in 30 ml of methanol and allowed to cool, and 150 ml of ether was gradually added thereto to gradually deposit crystals. The obtained crystals were washed with 80 ml of benzene to obtain 19.81 g (71.9%) of a white powder. The characteristics of the powder were as below:

Mp. (melting point): 281–283° C.

$^1$H-NMR (400 MHz, $D_2O$)/δ:1.17 (18H, t, J=7.0 Hz, $CH_3$), 1.35 and 1.61 (each 4H, brs, C—$(CH_2$—$)_4$—C), 3.05–3.10 (4H, m, N—$CH_2$—C—C), 3.19 (12H, q, J=7.0 Hz, $CH_3CH_2N$)

$^{13}$C-NMR (100 MHz, $D_2O$)/δ:7.42, 21.66, 26.02, 53.27 and 57.12

Example 2

Synthesis of N,N'-bis-triethyl-1,6-hexanediyl-diammonium dihydroxide

In a flask, 15.54 g (34.8 mmol) of the N,N'-bis-triethyl-1,6-hexanediyl-diammonium dibromide obtained in Example 1 was dissolved in 100 ml of distilled water. 188 g of an ion exchange resin (Mitsubishi Chemicals, DIAION, SA10A, OH-type) and 100 ml of distilled water were added to the solution and it was gently stirred for 48 hours at room temperature. Filtration and vacuum concentration were effected to concentrate the solution to 50 ml, and the solution was diluted to 110 ml (107.6 g) with distilled water to obtain an aqueous solution of N,N'-bis-triethyl-1,6-hexanediyl-diammonium dihydroxide. When 0.05M-HCl was used for titration the concentration was found to be 0.3125 mmol/g (as $R^{2+}$) and the exchange rate was 96.6%.

Example 3

7.38 g (2.0 mmol) of the aqueous solution (0.2710 mmol/g) of N,N'-bis-triethyl-1,6-hexanediyl-diammonium dihydroxide and 0.106 g (0.84 mmol) of 32 wt % of NaOH were measured into a perfluorocarbon (teflon) jar and stirred for 15 minutes. 1.502 g (10 mmol) of colloidal silica (Snowtex-40) was added thereto and it was stirred for a further 30 minutes. 8.9 mg (0.026 mmol) of aluminum sulfate and 3.29 g of ion exchanged water were then added and it was stirred for 2 hours. Then, stirring was continued at 90° C. and, when the viscosity of the gel increased, stirring with a perfluorocarbon bar was started until the whole solution was changed to a dry gel. Thus, a powdery dry gel was obtained.

A half of the above dry gel was transferred to a perfluorocarbon cup, having an inner diameter of 20 mm and a height of 20 mm, and the cup was placed in an autoclave having an inner volume of 23 ml and containing 0.2 g of water. The autoclave was set to 175° C. for 24 hours. The resultant solid was moved to a filtration device where it was washed with ion exchange water and then dried at room temperature to obtain 0.370 g of a white powder. The powder was analyzed by X-ray diffraction. As a result, it was confirmed from the following characteristic peaks that the powder was zeolite [Al]-SSZ-31.

TABLE 2

| 2θ | d/n | I/I$_0$ |
|---|---|---|
| 6.1212 | 14.42722 | 13 |
| 7.44 | 11.87257 | 15 |
| 8.1 | 10.9066 | 9 |
| 8.34 | 10.59327 | 7 |
| 17.5967 | 5.03604 | 3 |
| 18.4896 | 4.79481 | 11 |
| 20.42 | 4.34568 | 6 |
| 21.206 | 4.18635 | 100 |
| 21.54 | 4.12218 | 13 |
| 22.1 | 4.01898 | 16 |
| 22.4554 | 3.95617 | 78 |
| 22.88 | 3.8837 | 8 |
| 24.8065 | 3.58628 | 15 |
| 26.8525 | 3.31749 | 3 |
| 31.0787 | 2.87533 | 9 |
| 32.9114 | 2.71928 | 4 |
| 37.42 | 2.40135 | 3 |
| 37.56 | 2.39272 | 3 |
| 37.78 | 2.37929 | 3 |
| 43.2049 | 2.09227 | 5 |

Example 4

167.87 mg of the crystal made in Example 3 was charged in an alumina laboratory dish and, in a muffle furnace, it was heated under an air flow at 100 ml/min from room temperature to 550° C. at an elevation rate of 2° C./min. Then it was kept at 550° C. for 2 hours. After that, the temperature was elevated to 600° C. at an elevation rate of 2° C./min and then it was kept at 600° C. for 4 hours. It was allowed to cool to obtain a calcined crystal (137.79 mg of white powder). From the following X-ray diffraction results, it was confirmed that it was zeolite [Al]-SSZ-31.

TABLE 3

| 2θ | d/n | I/I$_0$ |
|---|---|---|
| 5.66 | 15.60173 | 5 |
| 5.9 | 14.96761 | 17 |
| 6.2497 | 14.13086 | 75 |
| 7.46 | 11.84079 | 74 |
| 8.2 | 10.77381 | 47 |
| 8.72 | 10.13247 | 7 |
| 10.96 | 8.06611 | 6 |
| 11.2 | 7.8938 | 4 |
| 14.3 | 6.18877 | 3 |
| 14.58 | 6.07054 | 9 |
| 14.94 | 5.92506 | 6 |
| 17.815 | 4.97482 | 4 |
| 18.6 | 4.7666 | 4 |
| 18.9825 | 4.6714 | 8 |
| 20.3 | 4.3711 | 6 |
| 20.56 | 4.3164 | 12 |
| 21.2978 | 4.16851 | 100 |
| 22.24 | 3.994 | 36 |
| 22.51 | 3.9467 | 82 |
| 22.98 | 3.86703 | 12 |
| 23.28 | 3.81787 | 4 |
| 24.88 | 3.57585 | 5 |
| 25.1 | 3.54501 | 14 |
| 25.44 | 3.49839 | 9 |
| 27.35 | 3.25826 | 3 |
| 30.86 | 2.8952 | 3 |
| 31.2416 | 2.8607 | 8 |
| 33.2575 | 2.69176 | 4 |
| 36.5083 | 2.45919 | 3 |
| 37.64 | 2.38782 | 3 |
| 43.4766 | 2.07982 | 3 |
| 44.0916 | 2.05223 | 4 |

Example 5

In a manner similar to the above Examples 1 to 3, N,N'-bis-triethyl-1,7-heptanediyl-diammonium dihydroxide was prepared by replacing 1,6-dibromohexane with 1,7-dibromoheptane. The thus obtained N,N'-bis-triethyl-1,7-heptanediyl-diammonium dihydroxide was used as a structure directing substance in the same dry gel process as in Example 4 to produce zeolite [Al]-SSZ-31. This was confirmed by X-ray diffraction results.

Example 6

In the similar manner to the above Examples 1 to 3, N,N'-bis-triethyl-1,8-octanediyl-diammonium dihydroxide was prepared by replacing 1,6-dibromohexane with 1,8-dibromooctane. The thus obtained N,N'-bis-triethyl-1,8-octanediyl-diammonium dihydroxide was used as a structure directing substance in the same dry gel process as in Example 4 to produce zeolite [Al]-SSZ-31. This was confirmed by x-ray diffraction results.

What is claimed is:

1. A process for preparing zeolite [Al]-SSZ-31, comprising the steps of
   providing mixture of a zeolite source, an aluminum-containing material, an organic structure directing substance and water,
   drying said mixture to form a powdered dry gel, and
   contacting and reacting said dry gel with water stream at a saturated vapor pressure to produce an aluminum-containing zeolite [Al]-SSZ-31,
   wherein said organic structure directing substance is selected from the group consisting of N,N'-bis-triethyl-1,7-heptanediyl-diammonium dihydroxide, N,N'-bis-triethyl-1,8-octanediyl-diammonium dihydroxide, N,N'-bis-triethyl-1,9-nonanediyl-diammonium dihydroxide, N,N',-bis-triethyl-1,10-decanediyl-diammonium dihydroxide, and their salts.

2. The process according to claim 1, wherein said organic structure directing substance is N,N'-bis-triethyl-1,7-heptanediyl-diammonium dihydroxide or its salt.

3. The process according to claim 1, wherein said organic structure directing substance is N,N'-bis-triethyl-1,8-octanediyl-diammonium dihydroxide or its salt.

4. The process according to claim 1, wherein said organic structure directing substance is N,N'-bis-triethyl-1,9-nonanediyl-diammonium dihydroxide or its salt.

5. The process according to claim 1, wherein said organic structure directing substance is N,N'-bis-triethyl-1,10-decanediyl-diammonium dihydroxide or its salt.

6. The process according to claim 1, wherein said zeolite [Al]-SSZ-31 has a crystal structure that exhibits the following X-ray diffraction pattern characteristic peaks:

| $2\theta$ | d/n | $I/I_0$ |
|---|---|---|
| 6.10 | 14.49 | 6 |
| 7.38 | 11.98 | 30 |
| 8.18 | 10.81 | 1 |
| 20.30 | 4.37 | 15 |
| 21.12 | 4.21 | 69 |
| 22.25 | 3.99 | 100 |
| 24.73 | 3.60 | 23 |
| 30.90 | 2.89 | 11. |

7. The process according to claim 1, wherein said zeolite source includes at least one of gallium and iron sources.

8. The process according to claim 1, wherein said zeolite source includes at least one alkali metal source.

9. The process according to claim 1, wherein said reaction is effected in a sealed container in which said dry gel and water are placed and steam at a saturated vapor pressure is formed in said container.

10. The process according to claim 1, wherein said reaction is effected at a temperature in a range of 100–200° C.

11. The process according to claim 10, wherein said reaction is effected at a temperature in a range of 160–190° C.

12. The process according to claim 1, wherein the mixture contains a silica source as a source of the zeolite source and additionally contains an alkali, and contains, based on 100 moles of the silica source (as silica), 0.01–5 moles of the aluminum source (as aluminum), 1–30 moles of the alkali, 10–50 moles of the organic structure directing substance, and 500–10000 moles of water.

13. A process for preparing zeolite, comprising the steps of:
   providing a mixture of a zeolite source, an organic structure directing substance selected from the group consisting of N,N'-bis-triethyl-1,7-heptanediyl-diammonium dihydroxide, N,N'-bis-triethyl-1,8-octanediyl-diammonium dihydroxide, N,N'-bis-triethyl-10 1,9-nonanediyl-diammonium dihydroxide, N,N'-bis-triethyl-1,10-decanediyl-diammonium dihydroxide, and their salts, and water,
   drying said mixture to form a powdered dry gel, and
   contacting and reacting said dry gel with steam at a saturated vapor pressure to produce an aluminum-containing zeolite.

14. A process for preparing zeolite [Al]-SSZ-31, comprising the steps of
   providing a mixture of a zeolite source, an aluminum-containing material, an organic structure directing substance which is N,N'-bis-triethyl-1,6-hexanediyl-diammonium dihydroxide or its salt and water,
   drying said mixture to form a powdered dry gel, and
   contacting and reacting said dry gel with water steam at a saturated vapor pressure to produce an aluminum-containing zeolite [Al]-SSZ-31.

15. The process according to claim 14, wherein said zeolite [Al]-SSZ-31 has a crystal structure that exhibits the following X-ray diffraction pattern characteristic peaks:

| $2\theta$ | d/n | $I/I_0$ |
|---|---|---|
| 6.10 | 14.49 | 6 |
| 7.38 | 11.98 | 30 |
| 8.18 | 10.81 | 11 |
| 20.30 | 4.37 | 15 |
| 21.12 | 4.21 | 69 |
| 22.25 | 3.99 | 100 |
| 24.73 | 3.60 | 23 |
| 30.90 | 2.89 | 11. |

16. The process according to claim 14, wherein said zeolite source includes at least one of gallium and iron sources.

17. The process according to claim 14, wherein said zeolite source includes at least one alkali metal source.

18. The process according to claim 14, wherein said reaction is effected in a sealed container in which said dry gel and water are placed and steam at a saturated vapor pressure is formed in said container.

19. The process according to claim 14, wherein said reaction is effected at a temperature in a range of 100–200° C.

20. The process according to claim 19, wherein said reaction is effected at a temperature in a range of 160–190° C.

21. The process according to claim 14, wherein the mixture contains a silica source as a source of the zeolite source and additionally contains an alkali, and contains, based on 100 moles of the silica source (as silica), 0.01–5 moles of the aluminum source (as aluminum), 1–30 moles of the alkali, 10–50 moles of the organic structure directing substance, and 500–10000 moles of water.

22. The process according to claim 14, wherein said zeolite source includes at least one of gallium oxide and iron oxide.

23. The process according to claim 14, wherein said mixture includes an alkali.

24. A process for preparing zeolite, comprising the steps of:

providing a mixture of a zeolite source, an organic structure directing substance which is N,N'-bis-triethyl-1,6-hexanediyl-diammonium dihydroxide or its salt and water, drying said mixture to form a powdered dry gel, and contacting and reacting said dry gel with steam at a saturated vapor pressure to produce an aluminum-containing zeolite.

* * * * *